United States Patent [19]

Buccicone

[11] 4,051,946
[45] Oct. 4, 1977

[54] MAGNETIC CONVEYOR

[75] Inventor: Dario Buccicone, Crown Point, Ind.

[73] Assignee: Bucciconi Engineering Co., Inc., Gary, Ind.

[21] Appl. No.: 666,183

[22] Filed: Mar. 12, 1976

[51] Int. Cl.[2] .......................................... B65G 17/46
[52] U.S. Cl. .................................. 198/477; 198/679; 198/690
[58] Field of Search .................. 198/35, 41, 184, 195, 198/422, 477, 679, 690, 691; 214/1 BS, 6 DS; 271/193, 196, 197; 209/223 A, 225

[56] References Cited

U.S. PATENT DOCUMENTS

| 1,586,382 | 5/1926 | Reed | 198/195 |
| 3,297,136 | 1/1967 | Buccicone | 198/41 |
| 3,581,873 | 6/1971 | Spodig | 198/41 |
| 3,688,891 | 3/1970 | Long et al. | 198/41 |
| 3,847,269 | 11/1974 | Buccicone | 198/41 |

Primary Examiner—Evon C. Blunk
Assistant Examiner—Joseph E. Valenza
Attorney, Agent, or Firm—Guy A. Greenawalt

[57] ABSTRACT

A rail-type conveyor unit is disclosed for handling metal sheets or similar articles which is characterized by an elongate frame having sprocket assemblies at opposite ends on which are supported a pair of parallel, roller-type, endless chains, and having a series of electromagnets mounted in longitudinally spaced relation thereon which are operative for holding the sheets against padded cross members connecting the chains as the latter traverse a path along the bottom of the conveyor, the cross members being mounted on chain link pivot pins and the chain rollers riding on transversely spaced, track-forming rail members which constitute a part of depending extensions of the electromagnet pole members, and the electromagnet assemblies and associated rail members being arranged in the form of separate, longitudinally spaced units with connecting members of non-magnetic material.

10 Claims, 7 Drawing Figures

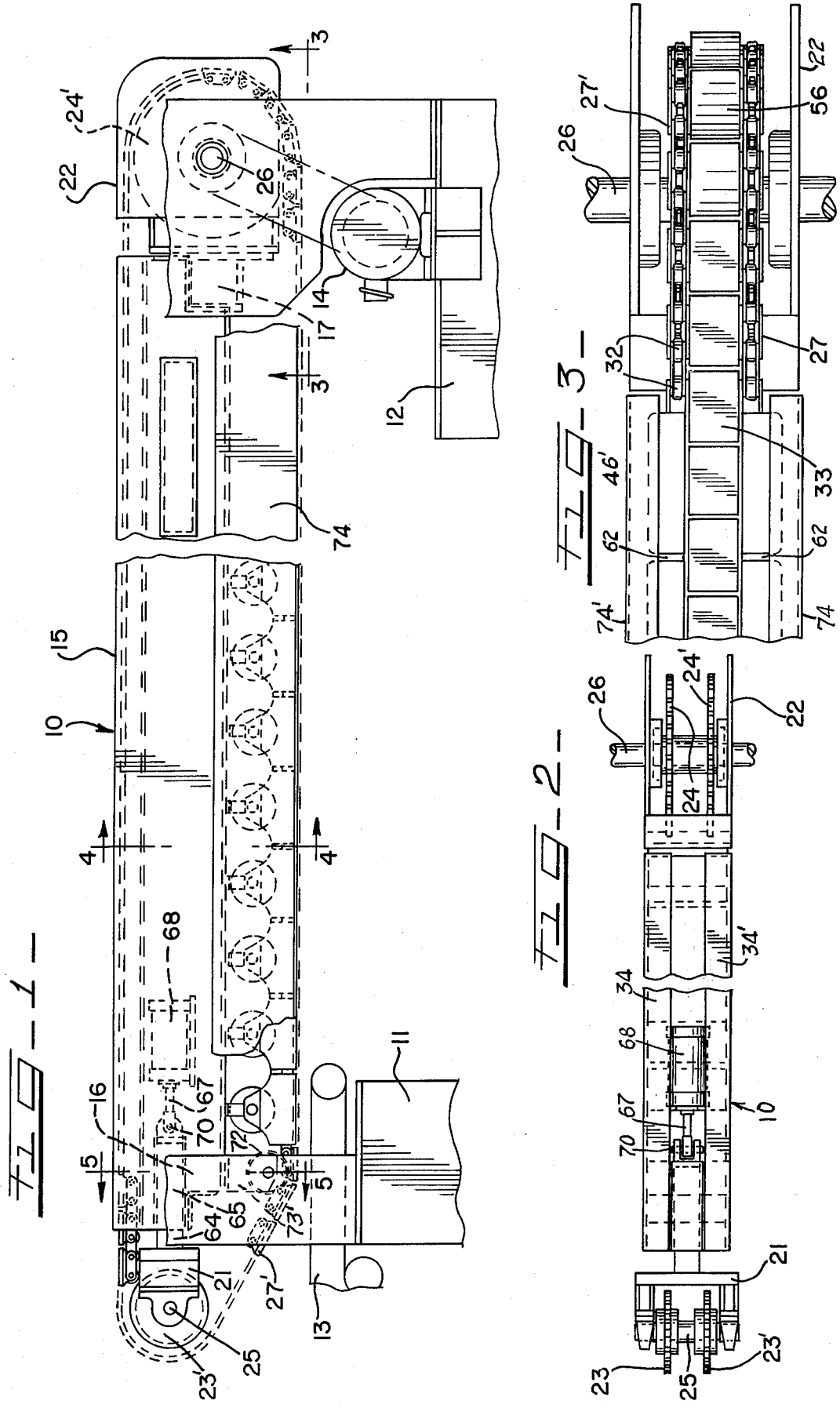

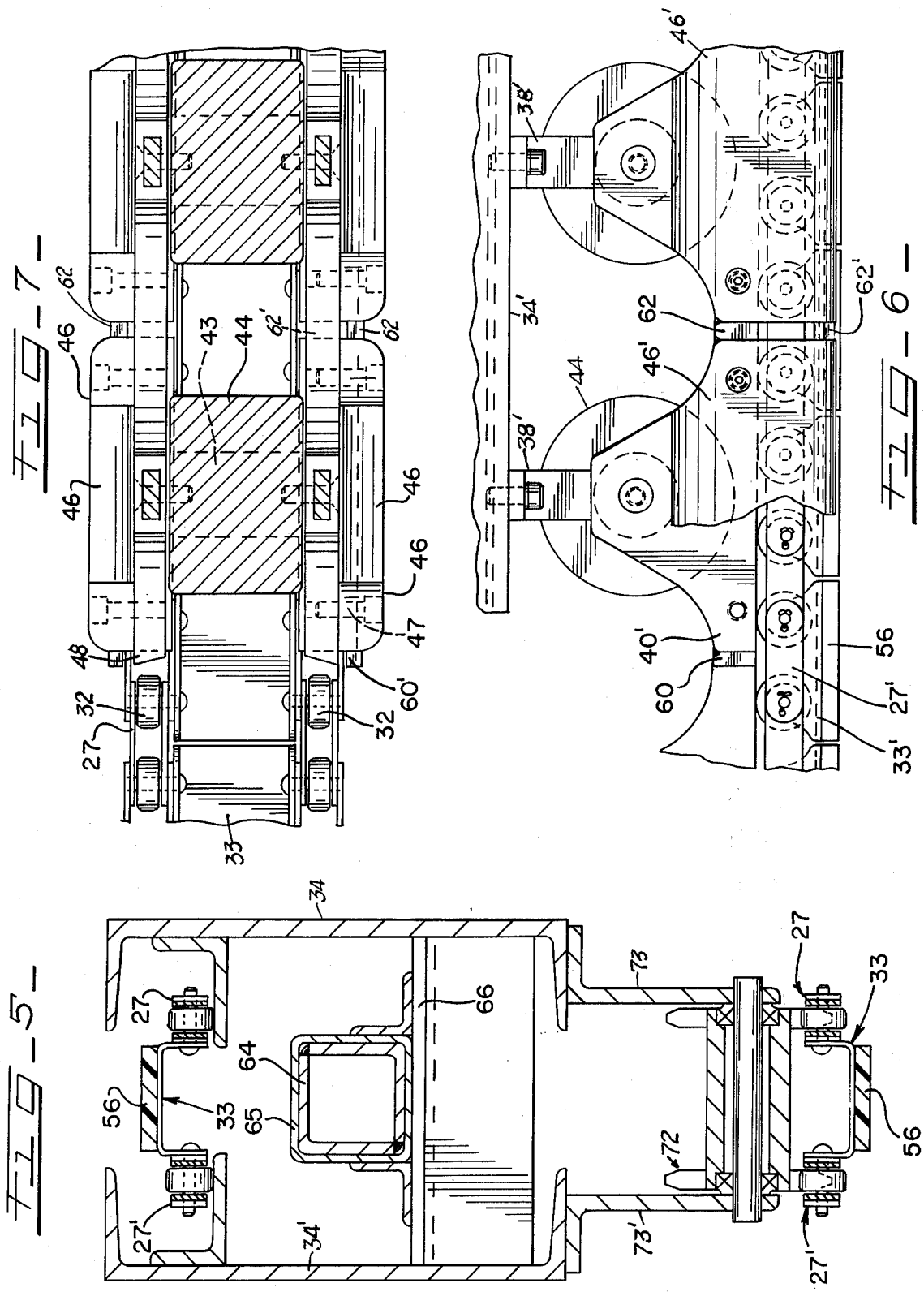

MAGNETIC CONVEYOR

This invention relates to article handling and is more particularly concerned with improvements in overhead conveyors of the type which employ magnetic force for holding metal sheets or similar articles against the bottom surface of traveling support elements.

Overhead conveyors of rail-like form have heretofore been developed which rely on magnetic force for holding sheets of steel or similar magnetizable material against the bottom surface of a traveling belt so as to advance the same for deposit on a pile or another conveyor. A typical conveyor of this character is shown, for example, in my U.S. Pat. Nos. 2,600,475, dated June 17, 1952, and 3,199,654, dated Aug. 10, 1965, wherein relatively narrow belts are employed which are substantially less in width than the width at the bottom of the conveyor rail and which are arranged in spaced, downwardly opening grooves or guide recesses on the bottom forming surface of a belt guiding plate secured at the bottom of the conveyor rail. Due to the belt weight and the unsupported length it has been customary to curve or bow the bottom face of the conveyor rail in order to accommodate a portion of the belt sag and reduce the amount of tension required to keep the belt seated in the guide grooves. With relatively long and heavy belts employed in handling sheets which are large and heavy, it has not been practical to apply a sufficient amount of tension to the belt to keep it traveling in a level plane. While this type of rail conveyor has been used extensively for handling flat metal sheets which will bend sufficiently to follow the bowed contour of the bottom face of the conveyor unit, some metal sheets, because of their thickness or other characteristics, have too great resistance to bowing to permit them to be handled satisfactorily with this type conveyor unit. Various modifications have been tried in an effort to adapt the narrow, belt-type conveyor for the handling of sheets having a high resistance to longitudinal bowing but with little success. Wide belt arrangements have been resorted to for handling sheets of this character but they have generally not been successful because of the inability to overcome a tendency to sag excessively due to their weight, particularly, when the conveyors are of a substantial length, and because of the inability to accommodate irregularities in the sheet surface due to warping or the like, with the result that they cannot be held against dropping away from the surface of the wide belt except through the use of very high strength magnets which greatly increases operating costs. One form of wide belt conveyor which provides a flat surface bottom run is shown in my U.S. Pat. No. 3,229,805, granted Jan. 18, 1966. While this form of conveyor provides a flat belt surface for engaging the metal sheets, the belt cannot always be made sufficiently flexible and to obtain satisfactory magnetic pull too large magnets are required. Also, the thickness of the belt is reduced with the result that the belt's life is greatly lessened as compared with the narrow belts which have substantially greater thickness.

One form of narrow belt conveyor which has been designed for handling sheets having bowing or other surface deforming irregularities is illustrated in my U.S. Pat. No. 3,144,927, dated Aug. 18, 1964. This conveyor has been successfully employed in the handling of most sheet materials but it has been found to have limitations, particularly in the handling of relatively large thick sheets where the weight of the sheet is an important factor. Another form of conveyor which provides a flat belt surface for engaging the sheets and which has a certain amount of flexibility in the lower belt run is shown in my U.S. Pat. No. 3,297,136, granted Jan. 10, 1967. This conveyor employs a wide belt which has the disadvantages set out above.

Another form of conveyor which is designed to provide a flat surface bottom run for carrying the sheets is shown in my U.S. Pat. No. 3,847,269, granted Nov. 12, 1974. In this conveyor guiding and supporting side rail members extend into grooves on opposite sides of pairs of relatively narrow roller backed belts with the center guide rail formation serving also as magnet pole pieces. This arrangement has limitations which restrict its use.

Belt-type magnetic conveyors in general have been found to do an excellent job when handling sheets of the usual thickness, that is, from 0.010 to 3/16 inch, which will bow sufficiently to be handled on the curved bottom type carrier run. The belt type magnetic conveyors which support the belts by rollers or the like so as to provide flat bottom conveyor runs for carrying the sheets have been successfully used in handling heavier sheets. However, in the heavier sheet thickness ranges and in the extremely long conveyor lengths, the use of continuous belts can be costly, especially, if a belt is damaged in one concentrated area, making it necessary to replace the entire belt. In addition, belt material generally is found to compress under heavy pressures resulting from the high magnetic pull which is required for handling heavy sheets or plates, resulting in rubbing contact between the sheets and the closely spaced pole bars, and placing a heavy load on the belts. While this can be compensated for, to some extent, by employing additional belt support rollers, it is not a satisfactory solution of the problem of excessive belt wear. Consequently, there is a need for improvements in overhead conveyors of this general type, particularly for handling the metal sheets of greater thickness and sometimes extreme length now being cut on shearing lines capable of handling heavy gauge sheet material, and, therefore, it is a general object of the present invention to provide an improved conveyor rail unit of the type having a traveling, plate or sheet carrying bottom run which will adequately support sheets with little or no bowing capabilities and with sheet surface irregularities normally encountered, which conveyor is designed so that it can be economically produced and maintained without excessive repair costs.

A more specific object of the invention is to provide in an overhead rail-type magnetic conveyor for transporting and handling metal sheets which are characterized by a high resistance to bowing in either direction and which may exert on the sheet contacting portions of the conveyor a separating force of high degree due to substantially greater weight.

It is a further object of the invention to provide a conveyor unit capable of handling relatively heavy metal sheets having a high resistance to bending so that the sheets must be carried while they remain in fixed planes, wherein, the conveyor is characterized by an elongate supporting frame having endless traveling chains mounted on end support sprockets which are longitudinally spaced, and having a plurality of longitudinally spaced, electromagnet assemblies in the form of separate units which include transversely spaced chain guide members disposed above the plane of the path traversed by bottom runs of chain carried sheet support members against which the sheets are held by magnetic force for travel with the chains.

A still further object of the invention is to provide an overhead conveyor unit capable of handling relatively heavy metal sheets having a high resistance to bending and requiring that the sheets be carried while they remain in fixed planes, wherein, the conveyor is characterized by an elongate supporting frame with transversely spaced, endless traveling chains mounted on end support sprockets and having a bottom run traversing a path along the bottom of the frame with sheet engaging pad members against which the sheets are held by magnetic force supplied by longitudinally spaced electromagnet assemblies, which assemblies include chain guide units spaced above the plane of the lower runs of the chain carried, sheet engaging pad members.

To this end the invention as claimed herein is embodied in a rail type magnetic conveyor unit which comprises an elongate support frame having longitudinally spaced pairs of transversely spaced end sprockets supporting a pair of roller type endless conveyor chains and a plurality of magnet assemblies spaced longitudinally of the frame between the end sprockets with each assembly forming a separable unit having pole extensions which include transversely spaced, parallel, longitudinally extending, track forming guide rails for the chain rollers and with the chains connected by transversely extending pad forming members against which the sheets are adapted to be pulled by magnetic force so that they may travel with the chains as the latter traverse the lower run at the bottom of the support frame.

The aforesaid and other objects and advantages of the invention will be best understood from a consideration of the preferred form of the conveyor structure which is described herewith and which is shown by way of illustration in the accompanying drawings wherein:

FIG. 1 is a side elevational view, with portions broken away or omitted, of a sheet piler employing a magnetic rail conveyor unit which incorporates therein the principal features of the present invention;

FIG. 2 is a plan view, with portions broken away, showing the top of the conveyor unit of FIG. 1;

FIG. 3 is a partial bottom plan view, showing an end portion of the bottom of the conveyor unit of FIG. 1;

FIG. 5 is a cross sectional view, to an enlarged scale and with portions broken away, the view being taken on the line 5—5 of FIG. 1;

FIG. 6 is a fragmentary side elevational view, with portions broken away, the view being taken on the line 6—6 of FIG. 4; and FIG. 7 is a fragmentary sectional view taken on the line 7—7 of FIG. 4.

Figure 4:
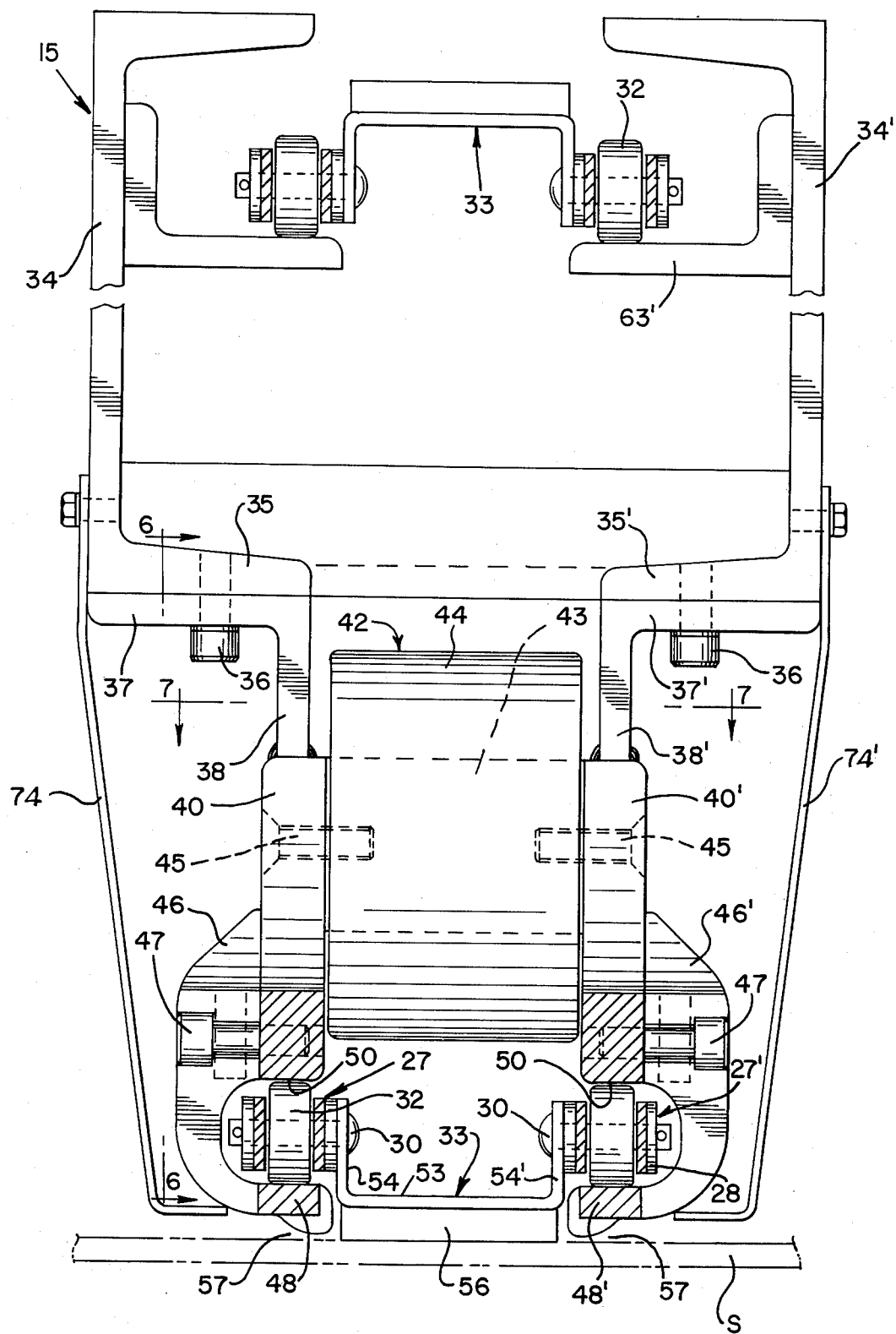
FIG. 4 is a cross sectional view, to an enlarged scale and with portions broken away, the view being taken on the line 4—4 of FIG. 1.

Referring to FIGS. 1 to 3, there is illustrated a sheet piler assembly comprising a single, rail-like conveyor unit 10 mounted on upright end supports 11 and 12. The assembly shown embodies the main elements of the sheet piler with suitable means (not shown) for supporting a pile of sheets deposited in the area between the end supports or end frames 11 and 12 and suitable end stop and back stop devices (not shown). An infeed conveyor 13 and associated drive means is mounted at the entrance end of the piler and drive means 14 for the conveyor unit 10 is provided at the opposite or exit end thereof. The conveyor frame structure 15 is provided with transverse apertures 16, 17 at its opposite ends adapted to receive support rails (not shown) for mounting it on the piler frame.

The conveyor rail unit 10 comprises an elongate support frame 15 (FIGS. 1 to 5) with sprocket housings or supports 20 and 22 mounted at the entrance and exit ends thereof, respectively. Chain supporting idler and drive sprockets 23, 23' and 24, 24' are mounted in paired and axially spaced relation on cross shafts 25 and 26 in the housings 20 and 22 for supporting at opposite ends of the frame 15 a pair of traveling roller-type chains 27 and 27' with predetermined transverse spacing. The chains 27 and 27' are of identical construction and each comprises a series of link plate structures 28 connected in a well known manner by cross pins 30 on which rollers 32 are mounted. The chains 27 and 27' are connected by a plurality of transversely extending bracket assemblies 33 which serve to support and advance the sheets or plates S (FIG. 4) as they traverse the lower run of the chains 27, 27' along the bottom of the elongate support frame 15.

The support frame 15, in the form shown, comprises a pair of elongate channel members 34, 34' (FIG. 4) which are arranged in oppositely disposed, transversely spaced relation. The inwardly extending bottom flanges 35, 35' of the channel members 34, 34' have secured on their bottom faces, by bolts 36, or other fastening means, a plurality of longitudinally spaced angle members 37, 37', with depending flanges 38, 38' in transversely spaced, parallel relation which carry on their bottom edges plate members 40, 40'. The angle members 37, 37' are of stainless steel or other non-magnetic material. The plate members 40, 40', which are of magnetizable material, are disposed in vertical planes and in transversely paired relation so as to form a support for an electromagnet assembly 42. The assembly 42 comprises a magnetic pole or core member 43 and an associated coil member 44. The pole member 43 extends between the transversely spaced, vertical plates 40, 40' and is secured by bolts 45, or the like, so as to support the surrounding coil 44. The pole plates or bars 40, 40' provide a path for the magnetic flux. Rail forming extension members 46, 46' are secured to the pole bars or plate members 40, 40' in depending relation by bolts 47. The pole bar rail members 46, 46' are generally C-shaped in vertical cross section and secured on the lower margins of the outside faces of the pole plate members 40, 40' so that they are disposed in spaced, confronting relation. On the lower inner margins there are bottom rail formations 48, 48' providing tracks for the rollers 32 of the transversely spaced chains 27, 27'. The rails or track members 48, 48' are spaced below the vertically aligned bottom faces 50, 50' of the pole plates 40, 40' a sufficient distance to accommodate the rollers 32 and with sufficient clearance to permit travel of the rollers 32 without binding and to provide some flexibility in the conveyor. The pole bar rail members 46, 46' are of magnetizable material and provide a path for the magnetic flux. The roller supporting rail members 48, 48' are tranversely spaced so as to accommodate the plate carrying assemblies 33 which extend between chains 27 and 27'.

The plate or sheet supporting bracket assemblies 33 each comprise a bracket member 53, formed of stainless steel or other non-magnetic material, and which is channel-shaped in transverse section, as shown in FIG. 4. The side flanges 54, 54' of each bracket member 53 are each mounted on two adjacent pivot pins 32 connecting the chain link plates 28 of the chains 27, 27'. The bottom web portion 55 of each bracket member 53 extends between the oppositely disposed, inner edges of the pole plate extensions 46, 46' with sufficient clearance to avoid interference with travel of the assemblies 33. As shown in the drawings a pad 56 of polyurethane, or the like, may be secured in any suitable manner on the sheet engaging face of the bracket assembly. The outermost, or lowermost face as viewed in FIG. 4 of the assembly, will be disposed so as to leave a relatively small air gap 57 between the bottom or outermost edges of the pole members 46, 46' and a sheet S being held on the conveyor for transport. With the members arranged as shown and with magnets having the relatively high strength required for handling heavy sheets, the flux path will extend a sufficient distance below the bottom extremities of the assemblies 33 to hold thereon sheets which have normal surface irregularities of the character which may be encountered in the heavy or thick sheets which the conveyor is designed to handle.

Each magnet assembly 42 together with the associated pole plates 40, 40' and rail plate members 46, 46' constitutes a separate unit. Each magnet is operable as a separate unit and is controlled by means of proper current supply wiring which will provide for turning on or off individual magnets or groups of magnets in any desired number when the units are assembled to form the conveyor rail unit. The separate units are longitudinally spaced and separated by non-magnetic members 60, 60' and 62, 62'. When it is desired to maintain the magnet assemblies as separate units in the rail assemblies, they may be spaced by non-magnetic members 60, 60' which may be welded to one end of each of the plate members 40, 40' and rail members 46, 46' as shown in FIG. 6. When it is desired to group the magnet assemblies, for example, into groups of two or four, separating non-magnetic members 62, 62' are welded to both plate members 40, 40' and rail members 46, 46' of adjoining units. In some cases it will be desirable to use the magnet assemblies as separate individual units with spacers 60, 60' welded to one end only and enabling the plate members 40, 40' and 46, 46' to be duplicated. There are advantages in using the magnet assemblies as individual units or sections. Electrically and magnetically the units or sections can be turned on and off with not much or no effect on adjacent sections. If a coil becomes defective there is no effect on adjacent sections. If a coil becomes defective it can easily be found since there would be a minimum or very little interaction between coils or sections. Also, the use of separate units or small groups of units facilitates removal and replacement or repair of a damaged unit.

The support frame members 34, 34' are provided with track forming angle members 63, 63' (FIG. 4) for supporting the chain rollers along the top run of the chains. At the entrance end of the conveyor the sprocket carrying shaft 25 is mounted in a longitudinally movable housing 20 which has tubular member 64 (FIGS. 1, 2 and 5) extending from its inner face and received in sliding, telescoping relation in the co-operating fixed tube 65 which is mounted on a fixed cross plate 66 in the frame 15. The end of a piston 67 extending from air cylinder 68 is pivotally coupled at 70 to the end of the tubular member 64. The air cylinder 68 is fixedly mounted in the frame 15 and controls the extension of the housing 20 and thereby the tension in chains 27, 27'. A sprocket assembly 72 (FIGS. 1 and 5) is mounted on transversely spaced bracket members 73, 73' depending from frame member 34, 34' which carries the chains at the beginning of the bottom run of the conveyor and takes the strain off the pole bars.

The frame members 34, 34' may be fitted with a top cover plate. Side cover members 74, 74' may be secured to the bottom margins of the outside faces of the frame members 34, 34'.

The magnet assembly units 42 and the associated flux conducting pole members 40, 40' and 46, 46' are readily accessible for removal by removing the bolts 36 when there is need to replace or repair an individual unit. Also, the chains 27, 27' and the sheet carrying brackets 33 are accessible upon removal of the cover plates 74, 74' and the rail forming pole bar members 46, 46' so that replacement or repair may be limited to the damaged or worn part. There is no need for replacement of the entire sheet carrying conveyor mechanism when only a portion has been damaged or is in need of repair.

I claim:

1. A rail type magnetic conveyor unit for conveying magnetizable metal sheets comprising an elongate support frame, a plurality of magnets supported in spaced relation on said frame, a pair of transversely spaced, endless conveyor chains carried on spaced pairs of end sprockets which are mounted in longitudinally spaced relation on said support frame, guide rail members extending in transversely spaced relation along the bottom of said support frame, said conveyor chains having rollers positioned for riding on said guide rail members so as to traverse a straight path along the bottom of said support frame, and sheet carrying bracket assemblies extending between said conveyor chains, each of said magnets having depending laterally spaced pole extensions supporting portions of said guide rail members along opposite sides of said support frame, said magnets being positioned and arranged to exert magnetic force sufficient to hold sheets relative to said bracket assemblies so that the sheets travel with said conveyor chains.

2. A rail type magnetic conveyor unit as set out in claim 1 wherein said conveyor chains comprise a series of link forming members and connecting pivot pins and said bracket assemblies are each supported on a pair of pivot pins on each of said conveyor chains which are in transverse alignment.

3. A rail type magnetic conveyor unit for conveying magnetizable metal sheets comprising an elongate support frame, a plurality of magnets supported in spaced relation on said frame, an endless conveyor in the form of a chain carried on rotatable end support members which are mounted in longitudinally spaced relation on said support frame, guide rail members extending along the bottom of said support frame, said conveyor including roller forming means positioned for riding on said guide rail members so as to traverse a straight path along the bottom of said support frame, and sheet carrying bracket assemblies pivotally mounted on said conveyor, said magnets having pole members positioned with depending laterally spaced portions having extensions forming sections of said guide rail members extending along opposite sides of said support frame and arranged to exert magnetic force sufficient to hold sheets on said bracket assemblies so that the sheets travel with said conveyor.

4. A rail type magnetic conveyor unit for conveying magnetizable metal sheets comprising an elongate support frame, a plurality of magnet assemblies supported in spaced relation on said frame, an endless conveyor chain assembly carried on end sprockets which are mounted in longitudinally spaced relation on said support frame, guide rail members extending along the bottom of said support frame, said conveyor chain assembly having associated rollers positioned for riding on said guide rail members so as to traverse a generally straight path along the bottom of said support frame, and sheet carrying assemblies connected for travel with said conveyor chain assembly, said magnets being positioned and arranged to exert magnetic force sufficient to hold sheets on said sheet carrying assemblies so that the sheets travel with said conveyor chain assembly, and said magnet assemblies each having pole extensions mounted in depending, transversely spaced relation on said support frame, with portions at the bottom thereof extending along the opposite sides of the path of said sheet carrying assemblies as they traverse the lower run of said conveyor assembly.

5. A rail type magnetic conveyor unit as set out in claim 4 wherein each of said magnetic assemblies including said pole extensions constitute a separate unit and said separate units are spaced by non-magnetizable members so as to form a continuous assembly along the conveyor while enabling removal of the individual units for replacement and/or repair.

6. A rail type magnetic conveyor unit as set out in claim 4 wherein said pole extensions include vertically disposed, transversely spaced, plate members and guide rail forming members supported thereon and extending below the bottommost faces of said plate members a sufficient distance to receive therebetween said rollers in free rolling relation on said guide rail forming members.

7. A rail type magnetic conveyor unit for conveying magnetizable metal sheets comprising an elongate support frame, a plurality of magnets supported in spaced relation on said frame, a pair of transversely spaced, endless conveyor chains carried on spaced pairs of end sprockets which are mounted in longitudinally spaced relation on said support frame, guide rail members extending in transversely spaced relation along the bottom of said support frame, said conveyor chains having rollers positioned for riding on said guide rail members so as to traverse a straight path along the bottom of said support frame, and sheet carrying bracket assemblies extending between said conveyor chains, said magnets being positioned and arranged to exert magnetic force sufficient to hold sheets relative to said bracket assemblies so that the sheets travel with said conveyor chains, said magnets each having depending pole extensions with portions of said guide rail members supported at the bottom thereof, and each of said magnets and its associated pole extensions constituting separate units which units are separated by non-magnetizable members with said guide rail members forming a continuous support for holding the conveyor in a straight path as it traverses the bottom run thereof.

8. A rail type magnetic conveyor unit for conveying magnetizable metal sheets comprising an elongate support frame, a plurality of magnets supported in spaced relation on said frame, an endless conveyor in the form of a chain carried on rotatable end support members which are mounted in longitudinally spaced relation on said support frame, guide rail members extending along the bottom of said support frame, said conveyor having roller forming means positioned for riding on said guide rail members so as to enable it to traverse a straight path along the bottom of said support frame, and sheet carrying bracket assemblies supported on said conveyor, said magnets being positioned and arranged to exert magnetic force sufficient to hold sheets relative to said bracket assemblies so that the sheets travel with said conveyor, and said magnets each having associated pole extensions constituting longitudinally spaced units which spaced units are connected by non-magnetizable members with portions thereof constituting said guide rail members arranged so as to form a continuous support for holding the conveyor in a substantially straight path as it traverses the bottom run thereof.

9. A rail type magnetic conveyor unit for conveying magnetizable metal sheets comprising an elongate support frame, a plurality of magnet assemblies supported in spaced relation on said frame, an endless conveyor chain assembly carried on end sprockets which are mounted in longitudinally spaced relation on said support frame, guide rail members extending along the bottom of said support frame, said conveyor chain assembly having associated rollers positioned for riding on said guide rail members so as to traverse a generally straight path along the bottom of said support frame, and sheet carrying assemblies connected for travel with said conveyor chain assembly, said magnets being positioned and arranged to exert magnetic force sufficient to hold sheets on said sheet carrying assemblies so that the sheets travel with said conveyor chain assembly, and each of said magnet assemblies including a pole member supported between a pair of transversely spaced, vertically disposed plate members forming pole extensions and depending therefrom a roller supporting member constituting a further pole extension.

10. A rail type magnetic conveyor unit for conveying magnetizable metal sheets comprising an elongate support frame, a plurality of magnet assemblies supported in spaced relation on said frame, an endless conveyor chain assembly carried on end sprockets which are mounted in longitudinally spaced relation on said support frame, guide rail members extending along the bottom of said support frame, said conveyor chain assembly having associated rollers positioned for riding on said guide rail members so as to traverse a generally straight path along the bottom of said support frame, and sheet carrying assemblies connected for travel with said conveyor chain assembly, said magnets being positioned and arranged to exert magnetic force sufficient to hold sheets on said sheet carrying assemblies so that the sheets travel with said conveyor chain assembly, and said magnet assemblies being disposed in longitudinally spaced relation on said frame and including depending pole extensions which are spaced at the bottommost portions to accommodate therebetween said conveyor chain assembly, said guide rail members constituting a part of said depending pole extensions, and said sheet carrying assemblies having pivotal connections with said conveyor chain assembly and extending outboard of the path of said conveyor chain assembly so that a sheet carried thereon along the bottommost run thereof will clear said pole extensions.

* * * * *